United States Patent
Wu

(10) Patent No.: US 6,969,073 B2
(45) Date of Patent: *Nov. 29, 2005

(54) CHUCK ASSEMBLY WITH A SEALING MEMBER

(76) Inventor: Hsuan-Lung Wu, No. 4-6, Le-Tien Lane, Feng-Shu Li, Nan-Tun Dist., Taichung City (TW)

(*) Notice: Subject to any disclaimer, the term of this patent is extended or adjusted under 35 U.S.C. 154(b) by 175 days.

This patent is subject to a terminal disclaimer.

(21) Appl. No.: 10/643,468

(22) Filed: Aug. 19, 2003

(65) Prior Publication Data

US 2005/0040609 A1 Feb. 24, 2005

(51) Int. Cl.⁷ .............................................. B23B 31/30
(52) U.S. Cl. .................. 279/4.07; 279/4.09; 279/137
(58) Field of Search .................. 279/4.07, 4.08, 279/4.09, 4.12, 50, 137

(56) References Cited

U.S. PATENT DOCUMENTS

| | | | | |
|---|---|---|---|---|
| 3,615,100 A | * | 10/1971 | Banner | 279/4.08 |
| 4,032,162 A | * | 6/1977 | Flinchbaugh | 279/4.09 |
| 4,094,521 A | * | 6/1978 | Piotrowski | 279/4.09 |
| 4,537,410 A | * | 8/1985 | Hiestand | 279/4.01 |
| 5,192,086 A | * | 3/1993 | Bucks | 279/4.09 |
| 5,302,062 A | * | 4/1994 | Baba et al. | 409/231 |
| 6,173,971 B1 | * | 1/2001 | Shen | 279/4.08 |
| 6,497,417 B2 | | 12/2002 | Wu | |
| 2005/0040608 A1 | * | 2/2005 | Wu | 279/4.07 |

* cited by examiner

Primary Examiner—Boyer D. Ashley
Assistant Examiner—Ali Abdelwahed
(74) Attorney, Agent, or Firm—Frommer Lawrence & Haug LLP; Ronald R. Santucci

(57) ABSTRACT

A chuck assembly includes a housing formed with an hydraulic fluid inlet, a sleeve mounted in the housing and formed with an annular groove, a shaft mounted rotatably in the sleeve and formed with a first fluid passage, a chuck unit mounted in the shaft, a piston subdividing a chamber between the chuck unit and the shaft into first and second compartments, and an annular elastic sealing member disposed in the annular groove and formed with a second fluid passage for passage of a hydraulic fluid from a supply through the hydraulic fluid inlet and the first fluid passage to the first compartment.

6 Claims, 7 Drawing Sheets

CHUCK ASSEMBLY WITH A SEALING MEMBER

BACKGROUND OF THE INVENTION

1. Field of the Invention

This invention relates to a chuck assembly, more particularly to a chuck assembly with a sealing member for preventing hydraulic fluid from entering into a clearance between a shaft and a sleeve of the chuck assembly.

2. Description of the Related Art

U.S. Pat. No. 6,497,417 discloses a conventional chuck assembly 1 that includes a housing 10 defining an inner space, a shaft 11 mounted co-axially and rotatably in the inner space and defining a chuck-receiving space 13 which has an enlarged end portion defining a piston-receiving chamber 131, a sleeve 12 secured to the housing 10 and sleeved on the shaft 11 so as to define a clearance 14 therebetween, a bearing unit 18 disposed between the sleeve 12 and the shaft 11, a chuck unit mounted in the chuck-receiving space 13 and including a plurality of jaws 16 for holding a workpiece (not shown), and a piston 15 mounted in the piston-receiving chamber 131, displaceable in an axial direction, and connected to the jaws 16 in such a manner that axial displacement of the piston 15 results in radial displacement of the jaws 16. The piston 15 subdivides the piston-receiving chamber 131 into first and second compartments 1311, 1312. A fluid channel 17 is formed in the chuck assembly 1, is in fluid communication with the first compartment 1311 of the piston-receiving chamber 131, and is adapted to be connected to a hydraulic fluid supply (not shown) so as to permit flow of pressurized hydraulic fluid into the first compartment 1311, thereby resulting in axial displacement of the piston 15.

Due to a large amount of the pressurized hydraulic fluid penetrating through the clearance 14, which can result in contamination of the chuck unit and the workpiece and a significant loss of the hydraulic fluid, a plurality of fluid passages 19 are required to be formed in the sleeve 12 and the housing 10, and a plurality of hydraulic fluid collectors (not shown) are required for collecting the hydraulic fluid. As a consequence, the dimensions of the chuck assembly 1 are increased considerably.

The disclosure of U.S. Pat. No. 6,497,417 is incorporated herein by reference.

SUMMARY OF THE INVENTION

The object of the present invention is to provide a chuck assembly with a sealing member that is capable of overcoming the aforesaid drawback of the prior art.

According to the present invention, a chuck assembly comprises: a housing that defines a cylindrical inner space therein and that is formed with a hydraulic fluid inlet adapted to be connected to a hydraulic fluid supply; a sleeve that is co-axially mounted in the inner space, that is secured to the housing, that defines a shaft-receiving space therein, and that is formed with an annular groove in fluid communication with the hydraulic fluid inlet; a hollow shaft that co-axially and rotatably extends through the shaft-receiving space, that defines a chuck-receiving space therein, that is rotable relative to the sleeve about an axis, and that is formed with a first fluid passage in fluid communication with the annular groove; a chuck unit that is co-axially mounted in the chuck-receiving space, that includes a plurality of angularly displaced jaws, and that cooperates with the shaft to define a piston-receiving chamber therebetween; a piston that is co-axially mounted in the piston-receiving chamber, that subdivides the piston-receiving chamber into first and second compartments, that is displaceable in an axial direction relative to the axis, and that is connected to the chuck unit in such a manner that axial displacement of the piston results in radial displacement of the jaws, the first compartment being in fluid communication with the first fluid passage; and an annular elastic sealing member that is received in the annular groove, that is sleeved on the shaft, and that is formed with a second fluid passage in fluid communication with the first fluid passage so as to permit flow of hydraulic fluid from the hydraulic fluid supply to the first compartment.

BRIEF DESCRIPTION OF THE DRAWINGS

In drawings which illustrate an embodiment of the invention.

DETAILED DESCRIPTION OF THE PREFERRED EMBODIMENT

Figure 1:
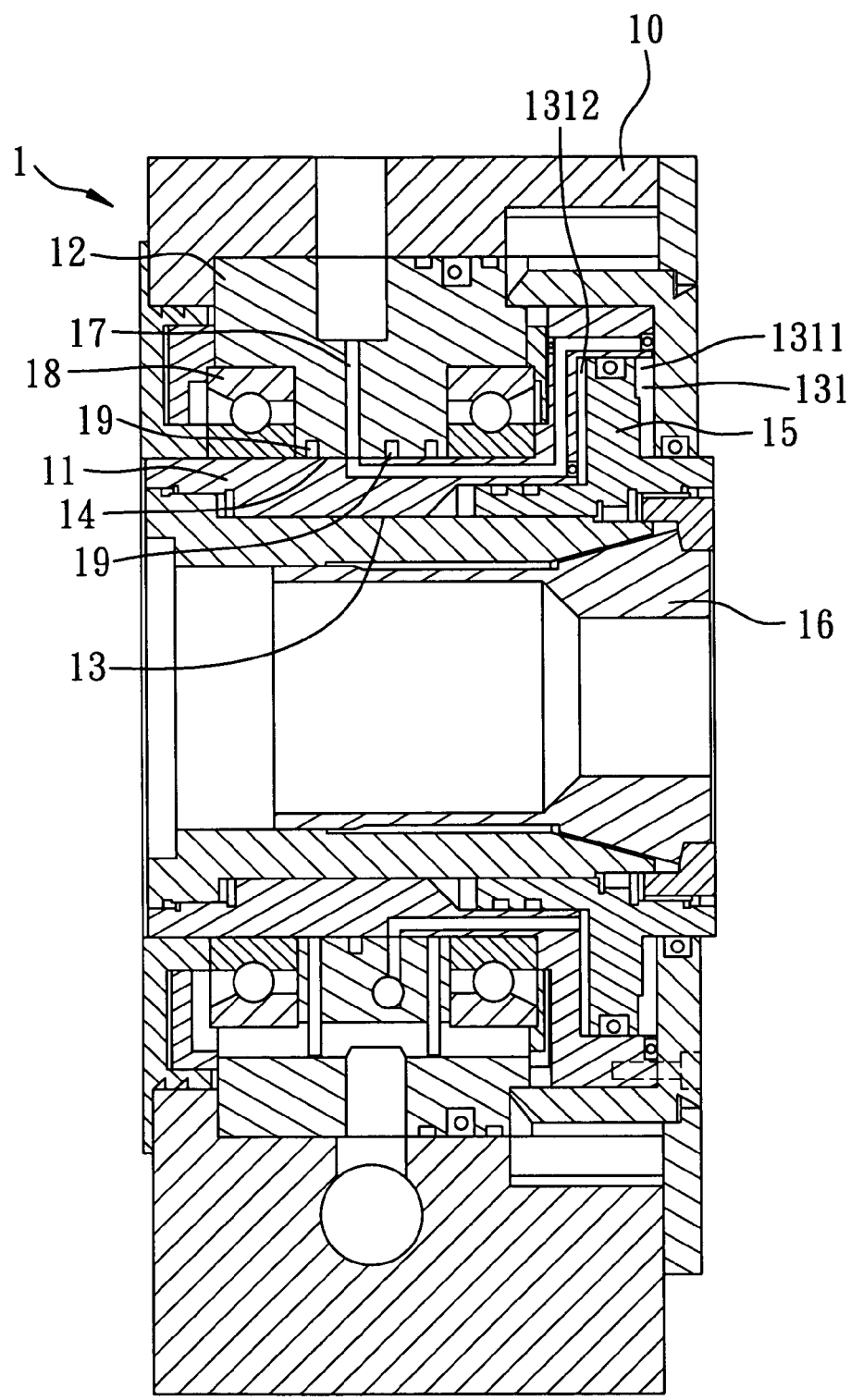
FIG. 1 is a sectional view of a conventional chuck assembly.
Figure 2:
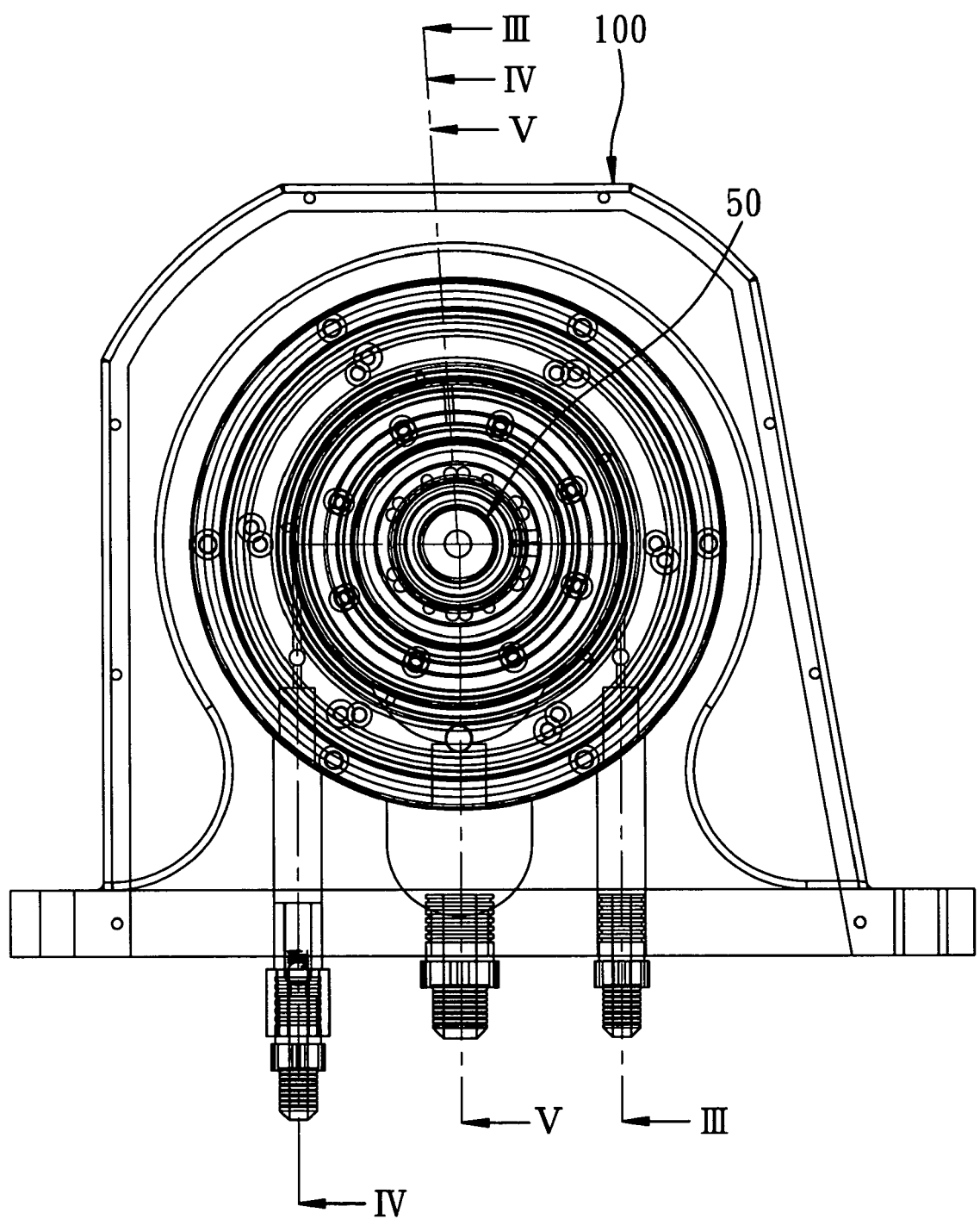
FIG. 2 is a side view of a chuck assembly embodying this invention.

FIGS. 2 to 6 illustrate a preferred embodiment of a chuck assembly of this invention for holding a workpiece (not shown).

The chuck assembly includes: a housing 100 that defines a cylindrical inner space 101 therein and that is formed with a hydraulic fluid inlet 102 (see FIG. 3) adapted to be connected to a hydraulic fluid supply (not shown); a sleeve 20 that is co-axially mounted in the inner space 101, that is secured to the housing 100, that defines a shaft-receiving space 201 therein, and that is formed with an annular groove 23 in fluid communication with the hydraulic fluid inlet 102; a hollow shaft 41 that co-axially and rotatably extends through the shaft-receiving space 201, that defines a chuck-receiving space 401 therein, that is rotatble relative to the sleeve 20 about an axis, and that is formed with a first fluid passage 412 in fluid communication with the annular groove 23; a bearing unit 45 disposed between the sleeve 20 and the shaft 41; a chuck unit 50 that is co-axially mounted in the chuck-receiving space 401, that includes a plurality of angularly displaced jaws 53, and that cooperates with the shaft 41 to define a piston-receiving chamber 402 therebetween; a piston 43 that is co-axially mounted in the piston-receiving chamber 402, that subdivides the piston-receiving chamber 402 into first and second compartments 4021, 4022, that is displaceable in an axial direction relative to the axis, and that is connected to the chuck unit 50 in such a manner that axial displacement of the piston 43 results in radial displacement of the jaws 53, the first compartment 4021 being in fluid communication with the first fluid passage 412; and an annular elastic sealing member 30 that is received in the annular groove 23, that is sleeved on the shaft 41, and that is formed with a second fluid passage 34 in fluid communication with the first fluid passage 412 (see FIGS. 3 and 6) so as to permit flow of pressurized hydraulic fluid from the hydraulic fluid supply to the first compartment 4021, thereby resulting in axial movement of the piston 43.

Figure 3:
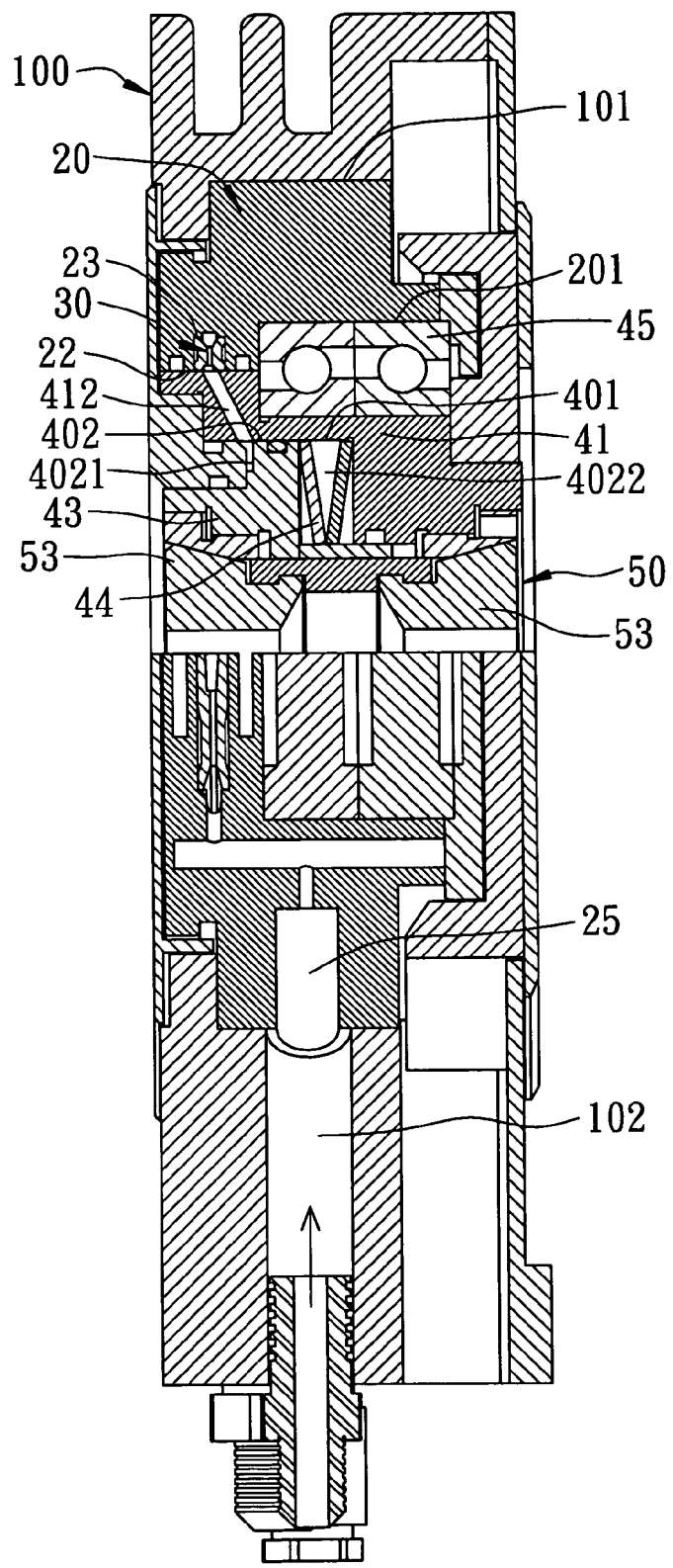
FIG. 3 is a sectional view of the chuck assembly taken along lines III—III in FIG. 2.
Figure 6:
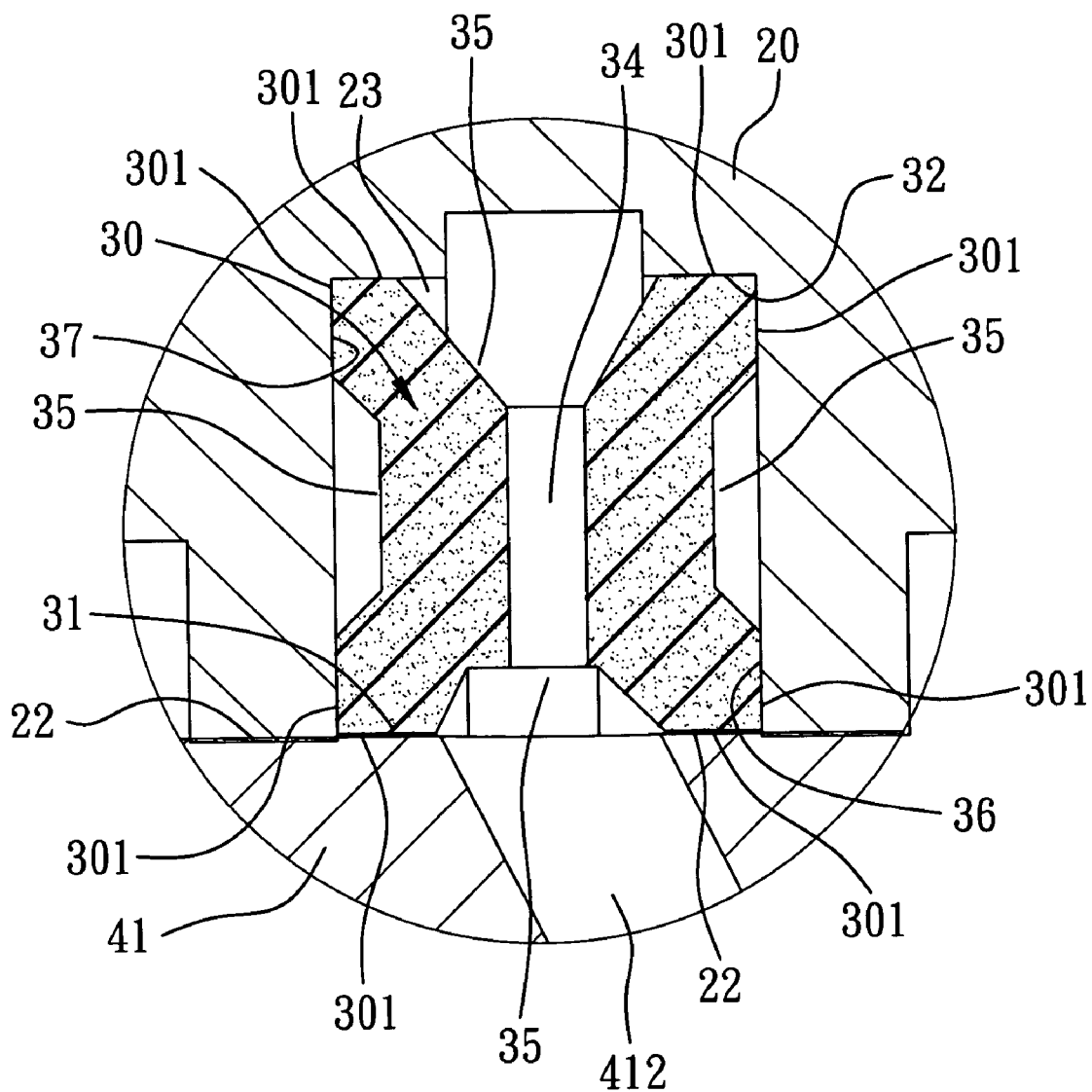
FIGS. 6 and 7 are enlarged sectional views of an encircled portion in FIG. 4 to illustrate how a sealing member is deformed when a pressurized hydraulic fluid passes therethrough.
Figure 7:
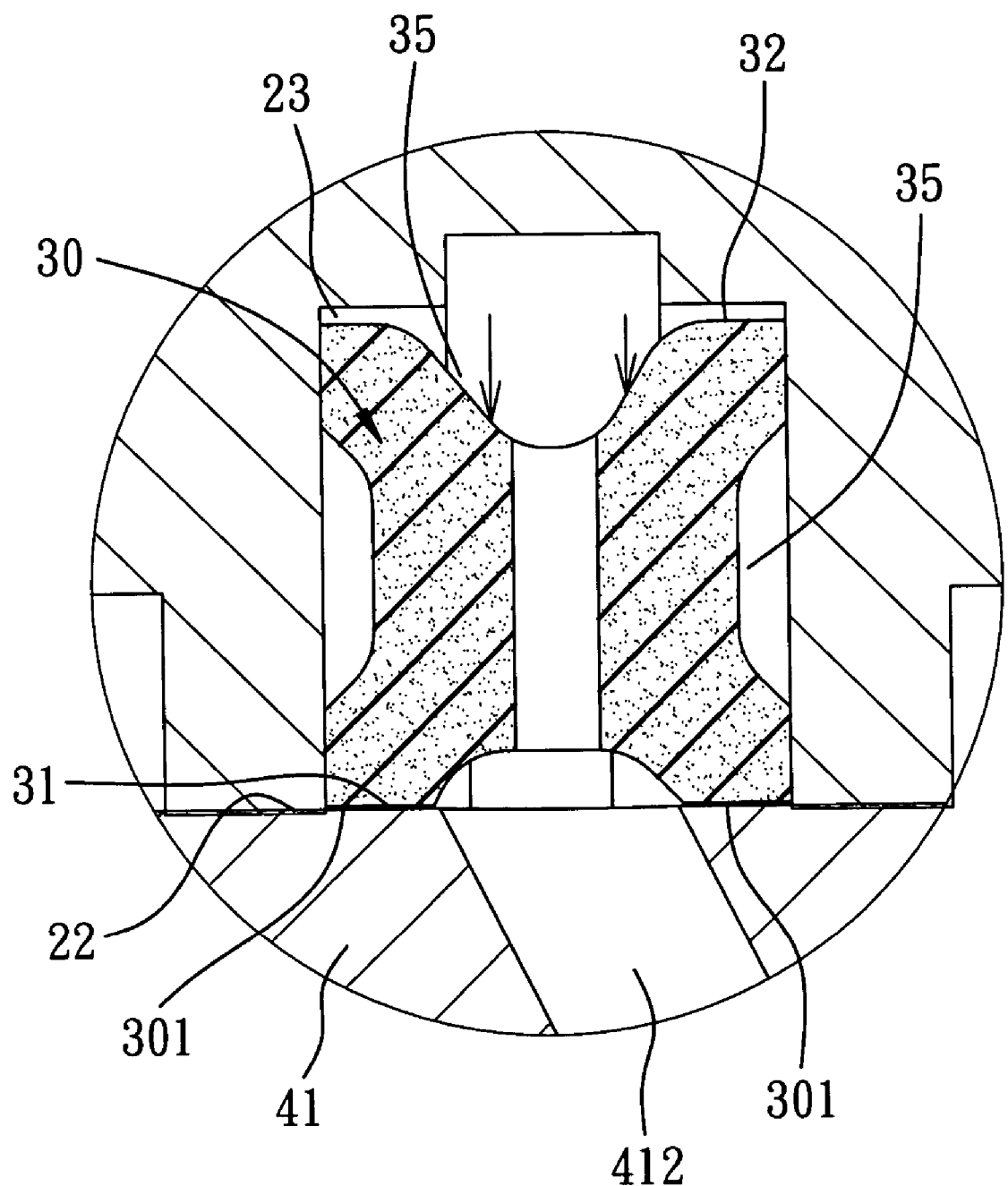

Referring to FIGS. 6 and 7, in combination with FIG. 3, the sealing member 30 has inner and outer sides 31, 32 that are opposite to each other in a radial direction relative to the axis, and first and second sides 36, 37 that are opposite to each other in the axial direction. Each of the inner and outer sides 31, 32 and the first and second sides 36, 37 has two opposite end portions 301 and a middle portion that extends between the end portions 301 and that is indented inwardly to form a recess 35 so as to permit deformation of the sealing member 30 (see FIG. 7) in a manner that the sealing member 30 is elastically compressed in a direction toward the shaft 41 and that the end portions 301 of the inner side 31 of the sealing member 30 abut against the shaft 41 when the pressurized hydraulic fluid flows through the second fluid passage 34, thereby preventing entry of the hydraulic fluid into a clearance 22 formed between the sleeve 20 and the shaft 41. Note that a relatively small amount of the hydraulic fluid is likely to penetrate into the clearance 22 during rotation of the shaft 41 relative to the sleeve 20 after the supply of the pressurized hydraulic fluid is stopped.

Referring to FIG. 3, the sleeve 20 is further formed with an oil channel 25 that is in fluid communication with the annular groove 23 in the sleeve 20 and the hydraulic fluid inlet 102 in the housing 100.

An urging member 44 is mounted in the second compartment 4022 in the piston-receiving chamber 402, and abuts against the piston 43 so as to accumulate a restoring force for restoring the piston 43 back to a normal position when the pressurized hydraulic fluid enters into the first compartment 4021 and moves the piston 43 to compress the urging member 44.

Figure 4:
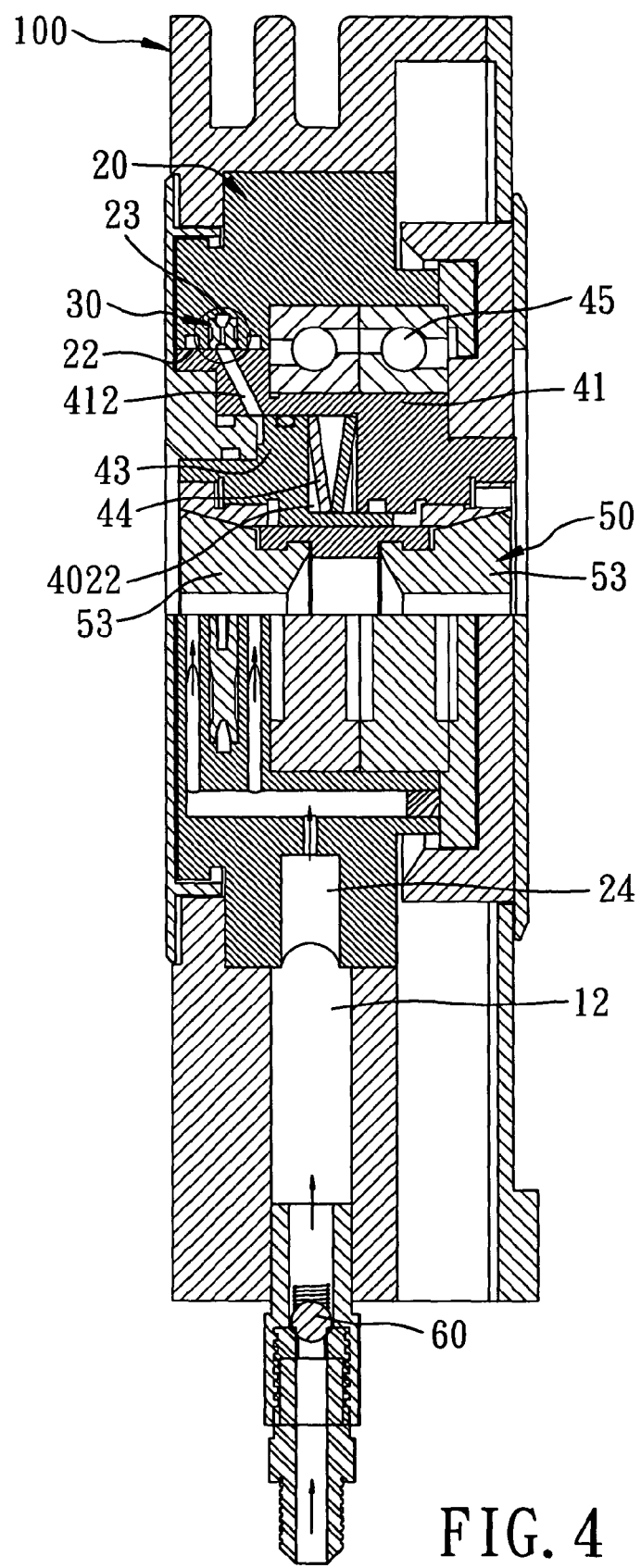
FIG. 4 is a sectional view of the chuck assembly taken along lines IV—IV in FIG. 2.

Referring to FIG. 4, the housing 100 is further formed with an air inlet 12 that is adapted to be connected to an air supply (not shown). The sleeve 20 is formed with an air channel 24 that is in fluid communication with the air inlet 12 in the housing 100 and the annular groove 23 in the sleeve 20 so as to permit cooling of the hydraulic fluid in the clearance 22. A check valve 60 is installed in the air inlet 12 for permitting the air flow to flow therethrough in a forward direction from the air supply to the air inlet 12 and for preventing the air flow to return in a reverse direction opposite to the forward direction.

Figure 5:
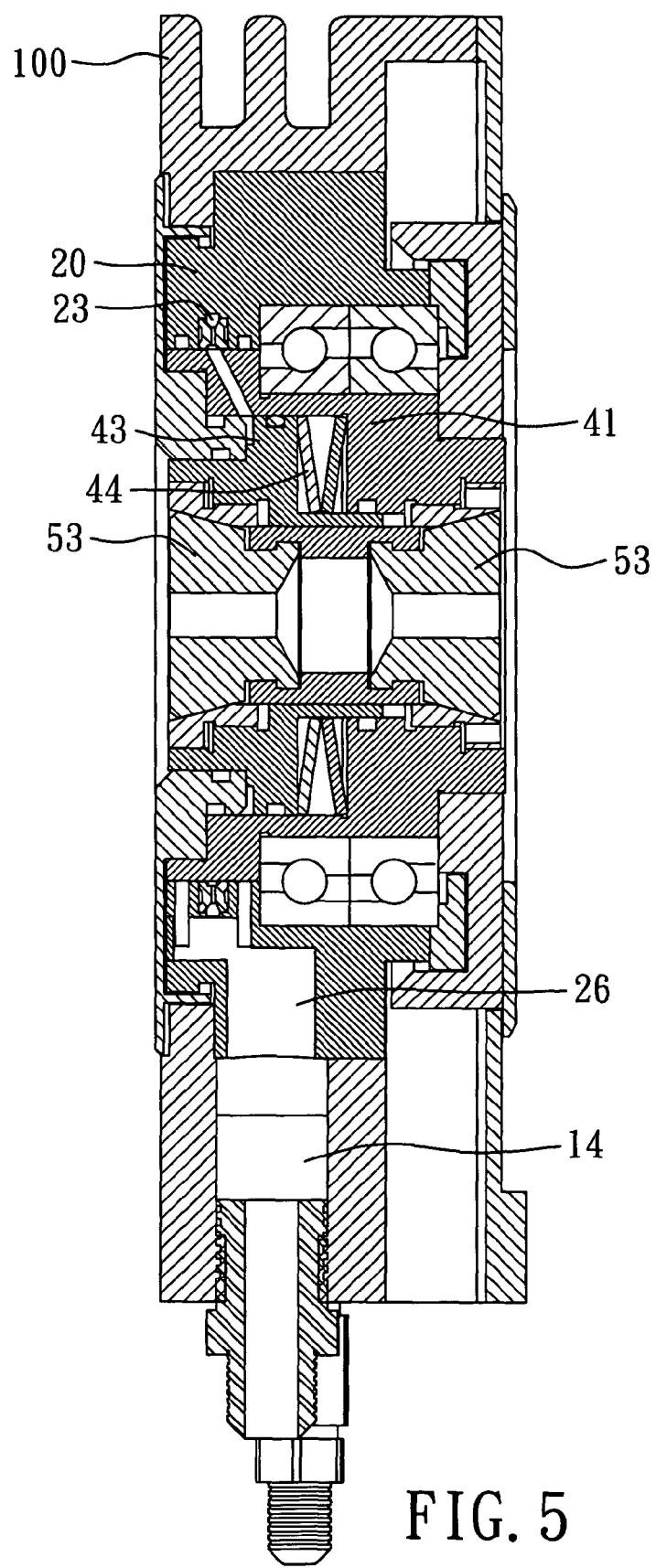
FIG. 5 is a sectional view of the chuck assembly taken along lines V—V in FIG. 2.

Referring to FIG. 5, the housing 100 is further formed with an oil outlet 14 that is adapted to be connected to an oil collector (not shown). The sleeve 20 is formed with a second oil channel 26 that is in fluid communication with the oil outlet 14 in the housing 100 and the annular groove 23 in the sleeve 20 so as to collect the hydraulic fluid leaking from the clearance 22.

With the inclusion of the sealing member 30 in the chuck assembly of this invention, the aforesaid drawback as encountered in the prior art can be eliminated.

With the invention thus explained, it is apparent that various modifications and variations can be made without departing from the spirit of the present invention. It is therefore intended that the invention be limited only as recited in the appended claims.

I claim:

1. A chuck assembly comprising:
  a housing that defines a cylindrical inner space therein and that is formed with a hydraulic fluid inlet adapted to be connected to a hydraulic fluid supply;
  a sleeve that is co-axially mounted in said inner space, that is secured to said housing, that defines a shaft-receiving space therein, and that is formed with an annular groove in fluid communication with said hydraulic fluid inlet;
  a hollow shaft that co-axially and rotatably extends through said shaft-receiving space, that defines a chuck-receiving space therein, that is rotatable relative to said sleeve about an axis, and that is formed with a first fluid passage in fluid communication with said annular groove;
  a chuck unit that is co-axially mounted in said chuck-receiving space, that includes a plurality of angularly displaced jaws, and that cooperates with said shaft to define a piston-receiving chamber therebetween;
  a piston that is co-axially mounted in said piston-receiving chamber, that subdivides said piston-receiving chamber into first and second compartments, that is displaceable in an axial direction relative to said axis, and that is connected to said chuck unit in such a manner that axial displacement of said piston results in radial displacement of said jaws, said first compartment being in fluid communication with said first fluid passage; and
  an annular elastic sealing member that is received in said annular groove, that is sleeved on said shaft, and that is formed with a second fluid passage in fluid communication with said first fluid passage so as to permit flow of hydraulic fluid from the hydraulic fluid supply to said first compartment.

2. The chuck assembly of claim 1, wherein said sealing member has inner and outer sides that are opposite to each other in a radial direction relative to said axis, and first and second sides that are opposite to each other in said axial direction, each of said inner and outer sides and said first and second sides having two opposite end portions and a middle portion that extends between said end portions and that is indented inwardly to form a recess so as to permit deformation of said sealing member in a manner that said end portions of said inner side of said sealing member abut against said shaft when the hydraulic fluid flows through said second fluid passage, thereby preventing entry of the hydraulic fluid into a clearance formed between said sleeve and said shaft.

3. The chuck assembly of claim 2, wherein said sleeve is further formed with an oil channel that is in fluid communication with said annular groove in said sleeve and said hydraulic fluid inlet in said housing.

4. The chuck assembly of claim 2, further comprising an urging member that is mounted in said second compartment and that abuts against said piston so as to accumulate a restoring force when the hydraulic fluid enters into said first compartment and moves said piston to compress said urging member.

5. The chuck assembly of claim 2, wherein said housing is further formed with an air inlet that is adapted to be connected to an air supply, said sleeve being formed with an air channel that is in fluid communication with said air inlet in said housing and said annular groove in said sleeve.

6. The chuck assembly of claim 3, wherein said housing is further formed with an oil outlet that is adapted to be connected to an oil collector, said sleeve being formed with a second oil channel that is in fluid communication with said oil outlet in said housing and said annular groove in said sleeve.

* * * * *